United States Patent
Tricaud et al.

(10) Patent No.: US 9,518,497 B2
(45) Date of Patent: Dec. 13, 2016

(54) SYSTEM AND METHOD FOR DETERMINING THE NET OUTPUT TORQUE FROM A WASTE HEAT RECOVERY SYSTEM

(71) Applicant: Cummins, Inc., Columbus, IN (US)

(72) Inventors: Christophe Tricaud, Columbus, IN (US); Timothy C. Ernst, Columbus, IN (US); James A. Zigan, Versailles, IN (US)

(73) Assignee: CUMMINS, INC., Columbus, IN (US)

( * ) Notice: Subject to any disclaimer, the term of this patent is extended or adjusted under 35 U.S.C. 154(b) by 106 days.

(21) Appl. No.: 14/336,710

(22) Filed: Jul. 21, 2014

(65) Prior Publication Data
US 2015/0027118 A1    Jan. 29, 2015

Related U.S. Application Data

(60) Provisional application No. 61/858,027, filed on Jul. 24, 2013.

(51) Int. Cl.
| | |
|---|---|
| B60K 6/20 | (2007.10) |
| F01K 23/10 | (2006.01) |
| F02G 5/04 | (2006.01) |
| F01K 23/06 | (2006.01) |
| F01K 25/06 | (2006.01) |
| F01N 11/00 | (2006.01) |
| F01N 5/02 | (2006.01) |
| G01L 3/24 | (2006.01) |

(52) U.S. Cl.
CPC .............. *F01N 11/00* (2013.01); *F01K 23/10* (2013.01); *F01K 25/065* (2013.01); *F01N 5/02* (2013.01); *F02G 5/04* (2013.01); *G01L 3/245* (2013.01); *Y02T 10/16* (2013.01)

(58) Field of Classification Search
CPC .......... F02G 5/04; G01L 5/0042; G01L 3/242; G01L 25/003; G01L 3/245; F01N 11/00; F01N 5/02
USPC .................. 60/597, 618, 616, 657, 670, 673
See application file for complete search history.

(56) References Cited

U.S. PATENT DOCUMENTS

| | | | |
|---|---|---|---|
| 3,559,724 A * | 2/1971 | Wilkinson | 165/259 |
| 4,489,563 A * | 12/1984 | Kalina | 60/673 |
| 4,693,087 A * | 9/1987 | Lagow | 60/670 |
| 7,313,470 B2 | 12/2007 | Zaremba et al. | |
| 7,463,949 B2 | 12/2008 | Tani et al. | |
| 8,061,139 B2 | 11/2011 | Bronicki | |
| 2009/0211253 A1 | 8/2009 | Radcliff et al. | |
| 2010/0251703 A1 | 10/2010 | Takeishi et al. | |
| 2011/0109157 A1 | 5/2011 | Tani | |
| 2011/0192163 A1 | 8/2011 | Kasuya | |
| 2012/0019010 A1* | 1/2012 | Nakamura et al. | 60/614 |
| 2013/0232963 A1* | 9/2013 | Jagoda | 60/413 |
| 2015/0089922 A1* | 4/2015 | Hussain et al. | 60/273 |
| 2015/0089943 A1* | 4/2015 | Hussain et al. | 60/618 |

FOREIGN PATENT DOCUMENTS

JP          58023210 A  *  2/1983  ............ F01K 23/02

* cited by examiner

*Primary Examiner* — Thai Ba Trieu
(74) *Attorney, Agent, or Firm* — Foley & Lardner LLP

(57) ABSTRACT

The disclosure provides a waste heat recovery system with a system and method for calculation of the net output torque from the waste heat recovery system. The calculation uses inputs from existing pressure and speed sensors to create a virtual pump torque sensor and a virtual expander torque sensor, and uses these sensors to provide an accurate net torque output from the WHR system.

18 Claims, 4 Drawing Sheets

SYSTEM AND METHOD FOR DETERMINING THE NET OUTPUT TORQUE FROM A WASTE HEAT RECOVERY SYSTEM

CROSS REFERENCE TO RELATED APPLICATIONS

The present application claims priority to U.S. Provisional Application No. 61/858,027 filed Jul. 24, 2013 and entitled "SYSTEM AND METHOD FOR DETERMINING THE NET OUTPUT TORQUE FROM A WASTE HEAT RECOVERY SYSTEM," which application is hereby incorporated herein by reference in its entirety.

STATEMENT REGARDING FEDERALLY SPONSORED RESEARCH OR DEVELOPMENT

This invention was made with government support under "Recovery Act—System Level Demonstration of Highly Efficient and Clean, Diesel Powered Class 8 Trucks (Supertruck)," Program Award Number DE-EE0003403 awarded by the Department of Energy (DOE). The government has certain rights in the invention.

TECHNICAL FIELD

This disclosure relates to a system and method for determining the net torque output from a waste heat recovery (WHR) system.

BACKGROUND

Increasing the efficiency of internal combustion engines is critical to meet customer expectations and to meet an array of government-mandated regulations. Internal combustion engines generate significant amounts of heat that heat exchangers eventually transfer to the air surrounding the internal combustion engine. By converting a portion of waste heat to useful energy, the efficiency of an engine is improved.

SUMMARY

Various embodiments provide methods and systems for determining a net output torque from a waste heat recovery system of an internal combustion engine system.

Particular embodiments provide a computerized method that includes receiving, a high pressure value corresponding to fluid pressure on a high pressure side of fluid circuit of a waste heat recovery system of an internal combustion engine, receiving, a low pressure value corresponding to fluid pressure on a low pressure side of a fluid circuit of the waste heat recovery system receiving an engine speed value. The method also includes determining an energy conversion device output torque of an energy conversion device of the waste heat recovery system a pump output torque of a pump component of the waste heat recovery system based on the high pressure value, the low pressure value and the engine speed value. The method includes calculating the net output torque from the waste heat recovery system based on a difference in the energy conversion device output torque and the pump output torque.

In particular embodiments, the method includes determining the energy conversion device output torque of an energy conversion device of the waste heat recovery system in response to a time derivative of the high pressure value and the low pressure value. The method includes determining the energy conversion device output torque of an energy conversion device of the waste heat recovery system in response to a static torque of the energy conversion device under a steady state condition, in accordance with particular embodiments. The method may include determining a pump power value and a pump speed value, and determining the pump output torque in response to the pump power value and the pump speed value. In particular embodiments, the method includes determining pump flow value and pump efficiency value and wherein the determining the pump power value further comprises determining the pump power value in response to the pump flow value and the pump efficiency value. The method includes determining a shift point in a transmission driven by the internal combustion engine based on the net output torque from the waste heat recovery system, in accordance with particular embodiments. The method may include determining a fuel efficiency of the internal combustion engine based on the net output torque from the waste heat recovery system.

Further embodiments provide an internal combustion engine system that includes a waste heat recovery system. The waste heat recovery system includes a condenser structured to operate on a working fluid, a feed pump fluidly coupled to the condenser and positioned downstream of the condenser so as to receive at least a portion of the working fluid from the condenser, a heat exchanger fluidly coupled to the feed pump downstream of the condenser so as to receive the at least a portion of the working fluid from the pump, an energy conversion device fluidly coupled to the heat exchanger so as to receive the at least a portion of the working fluid from the heat exchanger, a high pressure sensor positioned upstream of the energy conversion device and configured to determine a high pressure value of the working fluid upstream of the energy conversion device, and a low pressure sensor positioned downstream of the energy conversion device and configured to determine a low pressure value of the working fluid downstream of the energy conversion device. The heat exchanger includes a waste heat fluid circuit. The energy conversion device is fluidly coupled to the condenser. The internal combustion engine system also includes an internal combustion engine fluidly coupled to the waste heat fluid circuit of the heat exchanger, an engine speed sensor configured to determine an engine speed value of the internal combustion engine, and a net torque calculator configured to determine a net output torque from the waste heat recovery system. The net torque calculator is configured to determine the net output torque from the waste heat recovery system based on a difference between an energy conversion device output torque and a pump output torque. The energy conversion device output torque and the pump output torque determined are based on the high pressure value, the low pressure value, and the engine speed value.

In particular embodiments, the energy conversion device includes at least one of a turbine, a piston, a scroll, a screw, and an expander device configured to move or rotate as a result of a vapor of the working fluid expanding. The heat exchanger includes an exhaust gas recirculation boiler upstream from the condenser, in accordance with particular embodiments. The waste heat recovery system may include a pre-charge air cooler. In particular embodiments, the waste heat recovery system includes a recuperator configured to transfer heat from a first portion of the working fluid flowing from the energy conversion device to the condenser to a second portion of the working fluid flowing from the feed pump to the heat exchanger. The waste heat fluid circuit includes an exhaust gas recirculation fluid of the internal combustion engine, in accordance with particular embodiments. The internal combustion engine system may include a sub-cooler coupled to the condenser. In particular embodiments, the internal combustion engine system also includes a receiver positioned upstream of the condenser and downstream of the energy conversion device. The internal combustion engine system includes a fluid level sensor configured to determine a level value of the working fluid in the waste heat recovery system, in accordance with particular embodiments.

Still further embodiments provide a waste heat recovery system net output torque control system. The system includes an energy conversion device output torque module configured to determine an energy conversion device output torque of an energy conversion device of a waste heat recovery system. The energy conversion device output torque is determined based on a determination of a high pressure value of a high pressure side of a fluid circuit of the waste heat recovery system, a determination of a low pressure value of a low pressure side of the fluid circuit of the waste heat recovery system, and a determination of an engine speed value of an internal combustion engine in fluid communication with the waste heat recovery system. The system also includes a pump output torque module configured to determine a pump output torque of a pump component of the waste heat recovery system. The pump output torque is determined based on the determination of the high pressure value, the low pressure value, and the engine speed value. The system also includes a net torque module configured to determine a net output torque from the waste heat recovery system. The net output torque from the waste heat recovery system is determined based on a difference between the energy conversion device output torque and the pump output torque.

In particular embodiments, the waste heat recovery system net output torque control system includes a transmission shift module configured to determine a shift point in a transmission driven by the internal combustion engine based on the determined net output torque. The energy conversion device output torque module may be further configured to determine the energy conversion device output torque of the energy conversion device based on a static torque of the energy conversion device under a steady state condition. In particular embodiments, the pump output torque module is further configured to determine a pump flow value and a pump efficiency value and to determine the pump power value and the pump speed value in response to the pump flow value and the pump efficiency value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive methods and systems for determining a net output torque from a waste heat recovery system of an internal combustion engine system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
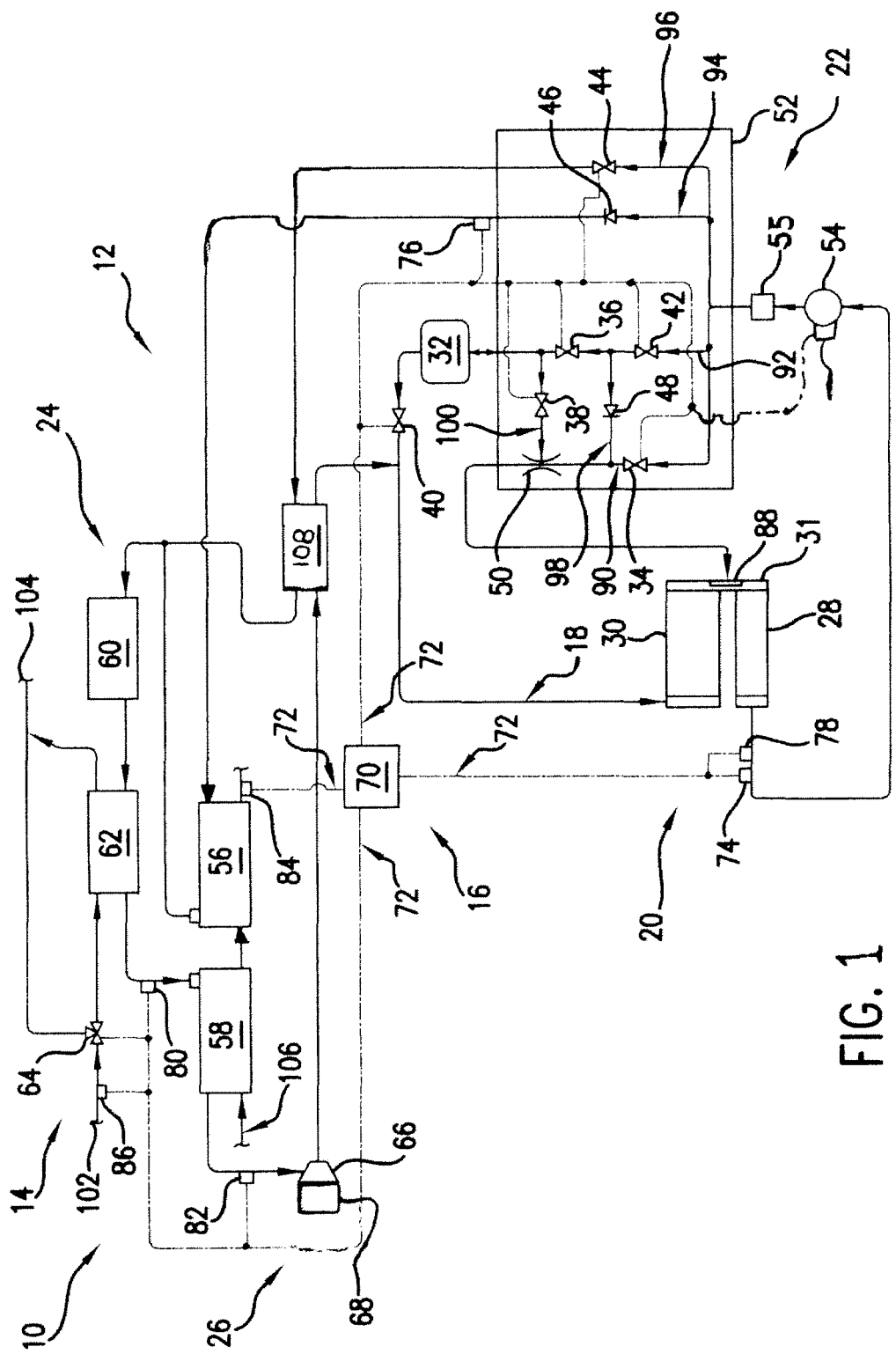
FIG. 1 is a schematic of a first exemplary embodiment of the present disclosure.

Referring now to FIG. 1, a portion of an internal combustion engine in accordance with a first exemplary embodiment of the present disclosure is shown as a schematic and generally indicated at 10. Engine 10 includes a waste heat recovery (WHR) system 12, a portion of an exhaust system 14, and a control system 16. WHR system 12 includes a WHR circuit 18, along which are positioned a fluid management portion 20, a fluid control portion 22, a heat exchange portion 24, and an energy conversion portion 26. Fluid management portion 20 provides containment and cooling for a working fluid of WHR system 12. Fluid control portion 22 regulates the flow of the working fluid throughout WHR system 12. Heat exchange portion 24 provides cooling to certain systems of engine 10 and serves to heat the working fluid to permit the working fluid to drive energy conversion portion 26, extracting useful work or energy from waste heat created by engine 10.

During operation of engine 10, WHR system 12 provides a net output torque that may be determined from the output torque of energy conversion portion 26 and the torque required to drive a pump of WHR system 12. The net output torque from WHR system 12 may be used for a multitude of purposes. For example, the net output torque may be used to determine shift points in a transmission driven by engine 10. In another example, the net output torque may be used to assist in the determination of the fuel efficiency of engine 10. The challenge with determining the net output torque of WHR system 12 is determining the net output torque by using the inputs from as many existing sensors as possible rather than adding sensors, which increases costs and complexity of WHR system 12. The present disclosure provides a system and method for determining the net output torque from WHR system 12 using a high-pressure value and a low-pressure value from WHR circuit 18, an engine speed value, and an energy conversion portion speed value.

Fluid management portion 20 includes a sub-cooler 28, a condenser 30, a receiver 32, and a feed pump 54. Receiver 32 serves primarily as a reservoir for WHR system 12.

Condenser 30 serves to provide cooling to the working fluid, converting gaseous working fluid to liquid working fluid. Sub-cooler 28 provides cooling to the liquid working fluid. Condenser 30 may be integral with sub-cooler 28, may connect to sub-cooler 28 by way of WHR circuit 18, or may be commonly mounted with sub-cooler 28 on a common base 31, which may include a plurality of fluid flow paths (not shown) to fluidly connect condenser 30 to sub-cooler 28. Receiver 32 may be physically elevated higher than sub-cooler 28, and may be connected to sub-cooler 28 through fluid control portion 22. The top of receiver 32 includes a vent that may be opened to condenser 30 by way of a vent valve 40. A fluid level sensor 88 is positioned in a location suitable to determine the level of liquid working fluid in sub-cooler 28 and condenser 30. In the exemplary embodiment, fluid level sensor 88 is positioned on common base 31. Feed pump 54 is positioned along WHR circuit 18 downstream from sub-cooler 28 and upstream from fluid control portion 22. Fluid management portion 20 may also include a filter drier 55 positioned along WHR circuit 18 downstream from feed pump 54 and upstream from fluid control portion 22.

Fluid control portion 22 includes a plurality of valves and an ejector 50 configured to regulate flow as needed throughout WHR system 12. Some of the valves receive signals from control system 16 and others are passive valves. The valves include electrically actuated on-off valves 34, 36, 38, electrically actuated proportional valves 42 and 44, electrically actuated vent valve 40, and passive check valves 46 and 48. Ejector 50 is also a passive device and operates in conjunction with certain valves to draw liquid working fluid from receiver 32. Many of the valves and ejector 50 may be included within a valve module 52. The function of the various valves and ejector 50 is to control the flow of working fluid in WHR system 12, which also controls the heat transferred to and from the working fluid flowing through WHR circuit 18. Though electrically actuated valves 34, 36, 38, 40, 42, and 44 may be described as on-off or proportional valves, this description is for convenience in the context of the exemplary embodiment. The on-off valves may be proportional valves and the proportional valves may be modulated valves capable of opening and closing rapidly to adjust the amount of working fluid flowing through the valves.

In the exemplary embodiment, heat exchange portion 24 includes an EGR boiler 56, an EGR superheater 58, a pre-Charge Air Cooler (pre-CAC) 60, an exhaust heat exchanger 62, an exhaust control valve 64, and a recuperator 108. Other embodiments may include more heat exchangers or fewer heat exchangers than described in the exemplary embodiment, and may include heat exchangers that are different from those in the exemplary embodiment. Recuperator 108 provides the ability to transfer heat from working fluid flowing from energy conversion portion 26 to condenser 30 of fluid management portion 20 to working fluid flowing from fluid control portion 22 to pre-CAC 60. EGR boiler 56 provides the ability to regulate the temperature of an EGR gas by transferring heat to the working fluid. It should be understood that the term EGR boiler is used for the sake of convenience. EGR boiler 56 serves more than one function in engine 10 and in the engines of the embodiments described hereinbelow, serving to cool EGR gas and to transfer heat from the EGR gas to the working fluid of WHR system 12. Pre-CAC 60 is positioned to permit transfer of heat from charge air to the working fluid. Exhaust heat exchanger 62 permits the controlled transfer of heat from engine exhaust gas to the working fluid. The amount of heat available to exhaust heat exchanger 62 is determined by exhaust control valve 64. EGR superheater 58 provides additional heat energy to the working fluid, which is in a gaseous state when it enters EGR superheater 58.

Energy conversion portion 26 includes an energy conversion device 66 and may include an auxiliary unit 68. Energy conversion portion 26 is capable of producing additional work or transferring energy to another device or system. For example, energy conversion portion 26 may include (e.g., as energy conversion device 66) a turbine, piston, scroll, screw, or other type of expander device that moves, e.g., rotates, as a result of expanding working fluid vapor to provide additional work. The additional work can be fed in the engine's driveline to supplement the engine's power either mechanically or electrically (e.g., by turning a generator), or it can be used to drive a generator and power electrical devices, parasitic, or a storage battery (not shown). Alternatively, energy conversion portion 26 can be used to transfer energy from one system to another system (e.g., to transfer heat energy from WHR system 12 to a fluid for a heating system. Auxiliary unit 68 may be part of a generator. If auxiliary unit 68 is a generator, it may feed a motor generator that may be part of a hybrid drive system.

Control system 16 may include a control module 70 and a wire harness 72. Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessor, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Control system 16 also includes a first, low-pressure sensor 74, which may be used to assist in determining whether sub-cooling of the working fluid in sub-cooler 28 is adequate, and a second, high-pressure sensor 76, which is used to measure high side pressure along WHR circuit 18 downstream from feed pump 54 and upstream from pre-CAC 60. Second pressure sensor 76 is positioned in the location shown in FIG. 1 because the temperature of the working fluid at that location is significantly lower than at other locations downstream of the various heat exchangers positioned along WHR circuit 18, but the pressure between high-pressure sensor 76 and energy conversion device 66 is sufficiently similar that the pressure may be considered the same. Keeping second pressure sensor 76 in a cooler location is more suitable for the packaging and durability of second pressure sensor 76. Control system 16 may also include fluid level sensor 88 positioned to measure the level of liquid working fluid in sub-cooler 28 and condenser 30. Control system 16 may use signals from fluid level sensor 88 to determine whether additional liquid working fluid should be added to sub-cooler 28 and condenser 30 from receiver 32.

Control system 16 may also include a plurality of temperatures sensors, such as temperature sensors 78, 80, 82, 84, and 86. Signals from first temperature sensor 78 may be used in conjunction with signals from first pressure sensor 74 to assist in determining whether sub-cooling of the working fluid is adequate. Second temperature sensor 80 provides signals to control system 16 that indicates the amount of heat that has been transferred to the working fluid by pre-CAC 60, exhaust heat exchanger 62, EGR boiler 56, and recuperator 108. Signals from third temperature sensor 82 in conjunction with signals from second pressure sensor 76 are used to estimate the amount heat that has been transferred to the working fluid from EGR superheater 58, which is an estimate of superheating of the working fluid at the inlet to energy conversion device 66.

Control system 16 may use signals indicative of the temperature of the working fluid from second temperature sensor 80 and third temperature sensor 82 to increase or decrease the heat transferred to the working fluid. Fourth temperature sensor 84 provides signals to control system 16 indicative of the temperature of EGR gas exiting EGR boiler 56. Control system 16 may use the signals from fourth temperature sensor 84 to increase or decrease heat transfer to the working fluid to vary cooling of the EGR gas. Signals from fifth temperature sensor 86 to control system 16 indicate the temperature of exhaust gas flowing toward exhaust heat exchanger 62. Control system 16 may use the temperature signals from fifth temperature sensor 86 in conjunction with information from second temperature sensor 80 and third temperature sensor 82 to determine the amount of exhaust gas needed to flow through exhaust heat exchanger 62 to heat the working fluid.

Control system 16 also includes a speed or RPM sensor 110 positioned to measure the speed of engine 10 and to transmit a signal representing the speed of engine 10 to control module 70. Speed sensor 110 is shown in conjunction with feed pump 54 because feed pump 54 is driven by engine 10, and thus the speed of feed pump 54 is proportional to the speed of engine 10, and may be the same as the speed of engine 10.

Control module 70 may be an electronic control unit or electronic control module (ECM) that monitors the performance of WHR system 12 or may monitor other conditions of engine 10 or an associated vehicle in which WHR system 12 may be located. Control module 70 may be a single processor, a distributed processor, an electronic equivalent of a processor, or any combination of the aforementioned elements, as well as software, electronic storage, fixed lookup tables and the like. Control module 70 may include a digital or analog circuit. Control module 70 may connect to certain components of engine 10 by wire harness 72, though such connection may be by other means, including a wireless system. For example, control module 70 may connect to and provide control signals to on-off valve 34, on-off valve 36, on-off valve 38, vent valve 40, proportional valve 42, proportional valve 44, and exhaust control valve 64.

The system described thus far is a Rankine cycle waste heat recovery system or an organic Rankine cycle if the working fluid is an organic high molecular mass fluid with a liquid-vapor phase change that is lower than the water-steam phase change. Examples of Rankine cycle working fluids, organic and inorganic, include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam.

The location of the aforementioned elements is arranged to obtain the benefits of the present disclosure. Condenser 30 is positioned along WHR circuit 18, upstream from sub-cooler 28 and downstream from energy conversion portion 26. As previously noted, condenser 30 may be positioned or located on base plate or common base 31, to which sub-cooler 28 may also be attached. Feed pump 54 is positioned along WHR circuit 18 downstream from sub-cooler 28 and upstream from valve module 52. First pressure sensor 74 and first temperature sensor 78 are positioned along WHR circuit 18 between sub-cooler 28 and feed pump 54. Filter drier 56 may be positioned along WHR circuit 18 downstream from feed pump 54 and upstream from valve module 52 of fluid control portion 22.

Fluid control portion 22 may include a plurality of parallel flow path portions formed along WHR circuit 18 that connect feed pump 54 to various elements of WHR system 12. A first flow path portion 90 connects the downstream side of feed pump 54 to sub-cooler 28 and condenser 30. Positioned along first flow path portion 90 downstream from feed pump 54 is on-off valve 34. Downstream from on-off valve 34 is ejector 50.

A second flow path portion 92, which is parallel to first flow path portion 90, connects feed pump 54 to receiver 32. Proportional valve 42 is positioned along second flow path portion 92 downstream from feed pump 54. On-off valve 36 is positioned along second flow path portion 92 between proportional valve 42 and receiver 32. Second flow path portion 92 is connected to first flow path portion 90 along a first connection portion 98 and a second connection portion 100. Passive check valve 48 is positioned along first connection portion 98, which connects to second flow path portion 92 in a location between proportional valve 42 and on-off valve 36, and which connects to first flow path portion 90 in a location between on-off valve 34 and ejector 50. On-off valve 38 is positioned along second connection portion 100, which connects to second flow path portion 92 in a location between on-off valve 36 and receiver 32, and which connects to ejector 50, positioned along first flow path portion 90. Though not part of second flow path portion 92, vent valve 40 is positioned along WHR circuit 18 between receiver 32 and condenser 30. The purpose of vent valve 40 is to permit vapor to move into and out from receiver 32 as liquid working fluid is moved out from and into receiver 32 along second flow path portion 92.

A third flow path portion 94, which is parallel to first flow path portion 90 and to second flow path portion 92, connects feed pump 54 to EGR boiler 56. Passive check valve 46 is positioned along third flow path portion 94, between feed pump 54 and EGR boiler 56. EGR boiler 56 is connected to pre-CAC 60. Second pressure sensor 76 is positioned along third flow path portion 94 between passive check valve 46 and EGR boiler 56.

A fourth flow path portion 96, which is parallel to first flow path 90, second flow path portion 92, and third flow path portion 94, connects feed pump 54 to recuperator 108 and then to pre-CAC 60, thus converging with any flow of working fluid from third flow path portion 94. Proportional valve 44 is positioned along fourth flow path portion 96 downstream from feed pump 54 and upstream from recuperator 108.

EGR superheater 58 is positioned along WHR circuit 18 downstream from pre-CAC 60 and upstream from condenser 30. Exhaust heat exchanger 62 is positioned along WHR circuit 18 between pre-CAC 60 and EGR superheater 58. Second temperature sensor 80 is positioned along WHR circuit 18 between exhaust heat exchanger 62 and EGR superheater 58. Energy conversion device 66 is positioned along WHR circuit 18 downstream from EGR superheater 58 and upstream from condenser 30. Third temperature sensor 82 is positioned along WHR circuit 18 between EGR superheater 58 and energy conversion device 66.

Exhaust heat exchanger 62 is connected to an upstream aftertreatment system 102 and exhaust control valve 64 is positioned between aftertreatment system 102 and exhaust heat exchanger 62. Both exhaust control valve 64 and exhaust heat exchanger 62 are connected on their downstream sides to an atmospheric vent 104, which may be a tailpipe, exhaust pipe, exhaust stack, or the like. Fifth temperature sensor 86 is positioned along exhaust system 14, upstream from exhaust control valve 64.

EGR superheater 58 and EGR boiler 56 are connected to a portion of an EGR circuit 106. EGR gas flows into EGR superheater 58 and then downstream from EGR superheater 58 into EGR boiler 56. From EGR boiler 56, EGR gas flows downstream along EGR circuit 106. EGR superheater 58 and EGR boiler 56 serve as heat exchangers for EGR circuit 106, providing a cooling function to the EGR gas flowing through EGR superheater 58 and EGR boiler 56. EGR superheater 58 and EGR boiler 56 also serve as heat exchangers for WHR circuit 18, raising the temperature of working fluid flowing through EGR boiler 56 and through EGR superheater 58. Fourth temperature sensor 84 is positioned along EGR circuit 106 downstream from EGR boiler 56.

WHR system 12 operates as follows. Sub-cooler 28 stores liquid working fluid. An engine 10 belt (not shown), crankshaft (not shown), gear drive with a clutch connection (not shown), or an electric motor (not shown) drives feed pump 54. Feed pump 54 pulls or draws liquid working fluid from sub-cooler 28. Feed pump 54 then forces liquid working fluid downstream to valve module 52. In valve module 52, the flow of liquid working fluid may be directed to one of four parallel flow path portions, as directed by control system 16 by way of the valves in valve module 52. First flow path portion 90 connects feed pump 54 to sub-cooler 28. Second flow path portion 92 connects feed pump 54 to receiver 32. Third flow path portion 94 connects feed pump 54 to EGR boiler 56. Fourth flow path portion 96 connects feed pump 54 to recuperator 108.

Liquid working fluid flows along first flow path portion 90 at approximately 17.5 gallons per minute (gpm) at about 15 pounds per square inch differential (psid) when control system 16 sends a command to on-off valve 34 to open. The liquid working fluid flows through ejector 50 and then downstream to condenser 30. On-off valve 34 is normally closed during operation of engine 10. However, on-off valve 34 may be opened by control system 16 during start and high idle conditions of engine 10 to limit flow through EGR boiler 56, recuperator 108, and pre-CAC 60, when such may be desirable.

Liquid working fluid may flow along second flow path portion 92 for several reasons. During normal operation of engine 10, proportional valve 42 is at least partially open to permit liquid working fluid to flow along first connection portion 98 through check valve 48, which may have a cracking or opening pressure of 5 psid, so that liquid working fluid flows to sub-cooler 28, thus forming a continuous loop of flowing liquid working fluid when check valve 48 opens. The amount of liquid working fluid that flows through proportional valve 42 is determined by the amount of liquid working fluid required through third flow path portion 94 and fourth flow path portion 96. If on-off valve 34 and proportional valve 42 are simultaneously opened, liquid working fluid flows through first flow path portion 90 and partially along second flow path portion 92, which may be used to prevent two-phase working fluid flow, i.e., liquid and gas, from reaching energy conversion portion 26. If on-off valve 36 is opened when proportional valve 42 is opened, on-off valve 34 is closed, on-off valve 38 is closed, and vent valve 40 is opened, the cracking pressure of check valve 48 causes liquid working fluid to flow upwardly along second flow path portion 92 to receiver 32. The flow of fluid into receiver 32 causes the level of liquid working fluid in receiver 32 to increase. Thus, in this valve configuration feed pump 54 may be connected simultaneously to sub-cooler 28 and to receiver 32.

If on-off valve 38 is open, on-off valve 36 is closed, and vent valve 40 is open while liquid working fluid flows from feed pump 54 along first flow path portion 90, then receiver 32 is connected along a parallel portion of WHR circuit 18 to feed pump 54. In this valve configuration, liquid working fluid will be drawn from receiver 32. The liquid working fluid flows through a portion of second flow path portion 92 and through on-off valve 38, which is positioned along second connection portion 100, into ejector 50. The liquid working fluid then flows downstream from ejector 50 to sub-cooler 28 and condenser 30, increasing the level of liquid working fluid in sub-cooler 28 or in condenser 30, which may contain some liquid working fluid. The increase in the level of the liquid working fluid in sub-cooler 28 increases sub-cooling, adjusting the saturation temperature of the liquid working fluid. Vent valve 40 is normally open during operation of engine 10, which permits vapor to flow to and from the top portion of receiver 32 to and from a top portion of condenser 30, permitting the level of liquid working fluid in receiver 32 to increase or decrease. Once the level of liquid working fluid has been increased in sub-cooler 28 and/or condenser 30 a desirable amount, on-off valve 34 and on-off valve 38 are closed, stopping flow from receiver 32 through second connection portion 100.

Liquid working fluid flows along third flow path portion 94 based on the opening of proportional valve 44 positioned along fourth flow path portion 96. Passive check valve 46 creates a backpressure along the upstream portion of third flow path portion 94, which biases the flow of liquid working fluid along fourth flow path portion 96. By partially closing proportional valve 44, the backpressure along the upstream portion of fourth flow path portion 96 increases, until passive check valve 46 cracks or opens under the increased backpressure from proportional valve 44. Relatively small amounts of liquid working fluid normally flow through first flow path portion 90 and second flow path portion 92, so most of the liquid working fluid provided to WHR circuit 18 by feed pump 54 flows through third flow path portion 94 and fourth flow path portion 96.

Control system 16 receives signals from second temperature sensor 80 indicative of the temperature of the working fluid prior to entering EGR superheater 58. If the temperature of the working fluid is insufficient for a desired level of superheating by EGR superheater 58, control system 16 may send a control signal to proportional valve 44 to increase or decrease flow through fourth flow path portion 96, which increases or decreases flow through recuperator 108 and decreases or increases flow through third flow path portion 94 to EGR boiler 56. The choice of flow paths through recuperator 108 or through EGR boiler 56 may be chosen by control system 16 based on the heat available in EGR boiler 56, recuperator 108, and/or the need to cool EGR gases flowing through EGR boiler 56, since an increase in the flow of working fluid through EGR boiler 56 causes an increase in heat transfer from EGR system 106 to the working fluid. Control system 16 may also receive temperature signals from third temperature sensor 82 indicative of the amount of superheating of the working fluid, which control system 16 may use to adjust the flow of liquid working fluid through third flow path portion 94 and fourth flow path portion 96. Control system 16 may also receive temperature signals from fourth temperature sensor 84 indicative of the temperature of EGR gas. Because cooling of EGR gas in EGR circuit 106 relates to emissions of engine 10, control system 16 may increase or decrease the flow of working fluid through third flow path portion 94 to increase or decrease cooling of EGR gas to optimize engine emissions.

Flow of working fluid through third flow path portion 94 and fourth flow path portion 96 converges upstream from pre-CAC 60. At pre-CAC 60, heat is transferred from charge air to the working fluid. From the pre-CAC 60, the working fluid flows to exhaust heat exchanger 62. Control system 16 is able to selectively direct heat to exhaust heat exchanger 62 by sending control signals to exhaust control valve 64, depending on the temperature signals control system 16 receives from second temperature sensor 80 and third temperature sensor 82, and the temperature of exhaust gases, which is indicated by signals from fifth temperature sensor 86. Any exhaust gas that does not flow into exhaust heat exchanger 62 flows around exhaust heat exchanger 62 directly to atmospheric vent 104. Thus, exhaust heat exchanger 62 selectively receives exhaust gas flowing through exhaust system 14 to atmospheric vent 104.

The working fluid, which is in a gaseous state because of heat transfer from the above-described heat exchangers, flows into EGR superheater 58, where additional heat energy is added to the gaseous working fluid. The superheated gaseous working fluid flows into energy conversion device 66.

The placement of pre-CAC 60 is beneficial from a thermodynamic cycle perspective. The heat from pre-CAC 60 is of sufficient quality or temperature to convert the liquid working fluid to vapor, which is a phase change of the working fluid, while performing a necessary engine function, the cooling of the engine body and/or the cylinder head. Cooling of exhaust gas in exhaust heat exchanger 62 is an optional function that may be reduced in favor of cooling of EGR gas in EGR boiler 56 and cooling of engine 10 in pre-CAC 60. Thus, the configuration of these components is advantageous in providing priority cooling to EGR gas, then the charge air in pre-CAC 60. Additional heat may then be added as needed in exhaust heat exchanger 62 and EGR superheater 58 by WHR system 12 to obtain optimal superheating of the working fluid.

High-pressure energy conversion device 66 may drive auxiliary unit 68. Auxiliary unit 68 can channel mechanical energy into the driveline (not shown) of engine 10 or can generate electrical energy to power electrical devices or for storage in one or more batteries. If auxiliary unit 68 is an electrical generator, the power could power a driveline motor generator (not shown) by way of power electronics (not shown) to help drive a vehicle (not shown) in which engine 10 is mounted. As the superheated gaseous working fluid flows through energy conversion device 66, the pressure and temperature of the gaseous working fluid decreases significantly prior to flowing into condenser 30. The decrease in temperature and pressure begin the condensation process, which continues in condenser 30. The working fluid, now in a liquid state, flows to sub-cooler 28, and the process begins again.

Figure 2:
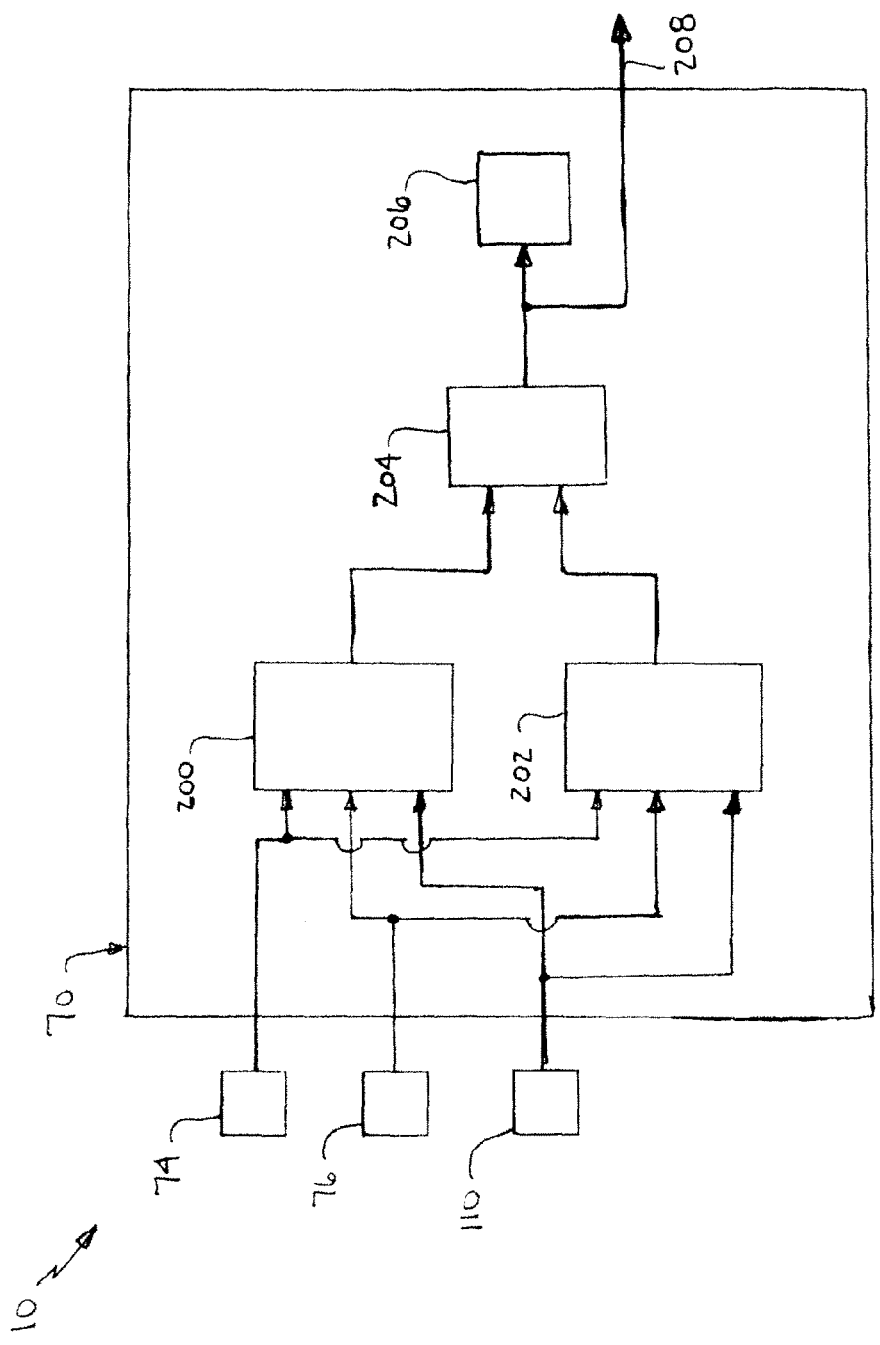
FIG. 2 is a view of certain modules of a control system of the engine of FIG. 1.

Turning now to FIG. 2, a portion of engine 10 and modules located or positioned in control module 70 in accordance with an exemplary embodiment of the present disclosure are shown. Control module 70 includes an energy conversion system output torque module 200, a pump torque module 202, a WHR torque module 204, a control system module 206, and a net torque output 208. Energy conversion output torque module 200 receives signals from low-pressure sensor 74, high-pressure sensor 76, and engine speed sensor 110. Energy conversion output torque module 200 uses the inputs from sensor 74, sensor 76, and sensor 110 to calculate the torque generated by energy conversion device 66, which is then transmitted to WHR torque module 204. Pump torque module 202 receives signals from low-pressure sensor 74, high-pressure sensor 76, and engine speed sensor 110. Pump torque module 202 uses the inputs from sensor 74, sensor 76, and sensor 110 to calculate the torque required to drive feed pump 54, which is then transmitted to WHR torque module 204. WHR torque module 204 uses the information transmitted by energy conversion output torque module 200 and pump torque module 202 to calculate the net torque output from WHR system 12. The net torque output from WHR torque module 204 may be provided to another control system module 206, where the net torque output may be used to calculate fuel efficiency or for other purposes, or the net torque output may be transmitted by control module 70 as net torque output 208 to another system on a vehicle in which engine 10 is located, such as a transmission or other device.

Figure 3:
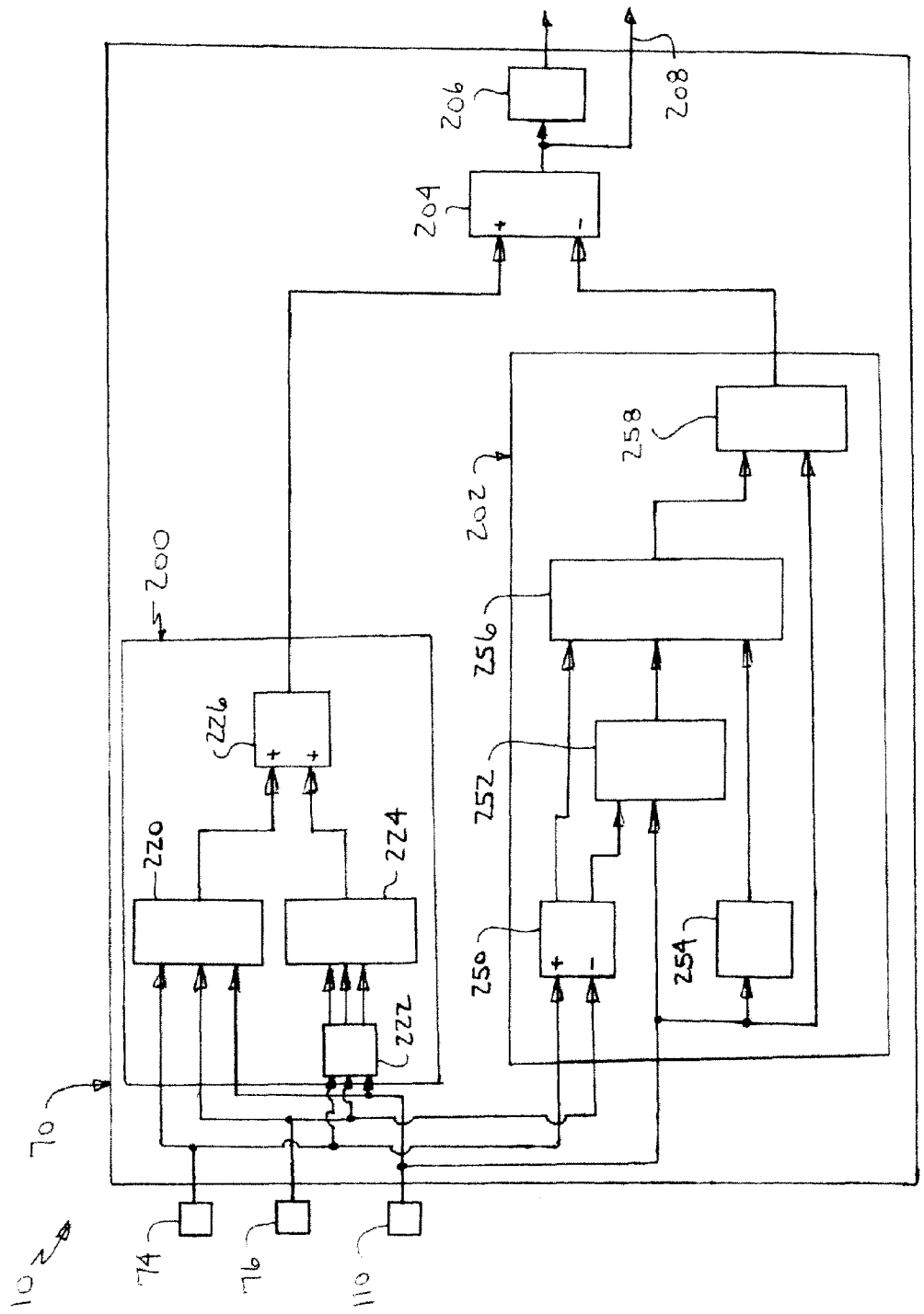
FIG. 3 is a view of certain processes included in the modules of FIG. 2.

Turning now to FIG. 3, an exemplary embodiment of the present disclosure of the modules of FIG. 2 is shown. Energy conversion output torque module 200 includes a steady-state model module 220, a differential module 222, a dynamic compensation model module 224, and a summing module 226. Steady-state model module 220 includes an empirically obtained model that describes the performance of WHR system 12 under varying pressure and speed conditions. The empirically obtained steady-state model is in the form of Equation (1).

$$Z1 = f(P_{High}, P_{Low}, \text{EngineSpeed}) \quad \text{Equation (1)}$$

In Equation (1), $P_{High}$ is the signal from high-pressure sensor 76, $P_{Low}$ is the signal from low-pressure signal 74, and EngineSpeed is the signal from engine speed sensor 110. The model for energy conversion device 66 is accumulated over a test cycle that represents typical operating conditions for engine 10. In an exemplary embodiment, the model for energy conversion device is a Federal Test Procedure (FTP) and the number of data points for the steady-state model is approximately 3,000. These data points may represent a variety of operating conditions, for example eight operating conditions that includes various pressure values of WHR system 12 in conjunction with varying speeds of energy conversion device 66. The steady-state model is able to use engine speed rather than a speed of energy conversion device 66 since a ratio between engine speed and the speed of energy conversion device 66 is acquired as part of the empirical model, and thus the engine speed may be used to correlate to a speed of energy conversion device 66. Steady-state model module 220 contains a model that may also be described as a "static" model from the perspective that WHR system 12 is operating under a relatively fixed condition rather than changing with time.

While applicant recognized that steady-state model module 220 provided an approximation of the torque output of energy conversion device 66, actual torque measurements of energy conversion device 66 indicated that the actual torque output of energy conversion device 66 could vary significantly from the steady-state or static model of steady-state model module 220. Such variations can significantly affect other systems using a net torque output calculated using such a torque, such as shift points in a transmission, fuel efficiency calculations, and other functions. While the Applicant recognized that a torque sensor could be added to energy conversion device 66, the addition of a torque sensor would increase cost and complexity, both of which are undesirable. Rather than adding an additional sensor, Applicant determined through extensive experimentation and modeling that the inputs from low-pressure sensor 74, high-pressure sensor 76, and engine speed sensor 110 could be used to provide a dynamic analysis of the torque output from energy conversion device 66, which, when combined with the steady-state torque, yields an improved torque calculation that agrees well with the output from a torque sensor, thus providing a virtual torque sensor for energy conversion device 66.

In order to provide improved energy conversion device 66 torque output, energy conversion system output torque module 200 receives inputs from low-pressure sensor 74, high-pressure sensor 76, and engine speed sensor 110, and directs those inputs to differential module 222. In differential module 222, each input is differentiated with respect to time, and the resultant time varying differential is transmitted to dynamic compensation model module 224. Dynamic compensation model module 224 includes a model generated from empirical data acquired during an engine qualification test, such as an FTP cycle test, that provides a topographical model based on limited data points that can be used to extrapolate or interpolate data points as needed during operation of WHR system 12, providing a dynamic component to the output torque calculation of WHR system 12. Though the model is in the form of Equation (2), the model is a four-dimensional model in that the equation is a function of the time derivatives of the inputs from high-pressure sensor 76, low-pressure signal 74, and engine speed sensor 110.

$$Z1 = f\left(\frac{d(P_{High})}{dT}, \frac{d(P_{Low})}{dT}, \frac{d(\text{EngineSpeed})}{dT}\right) \quad \text{Equation (2)}$$

Once the model in module 224 has established, using the differential inputs from differential module 222, the dynamic component of torque from energy conversion device 66, that torque value is transmitted to summing module 226.

In summing module 226, the static torque component from steady-state model module 220 and the dynamic torque component from dynamic compensation model module 224 are added, providing the net torque output from energy conversion device 66, TurbineTorque (Nm). As noted hereinabove, because this torque calculation is produced based on pressure in WHR circuit 18 and the speed of engine 10, energy conversion system output torque module 200 thus forms a virtual torque sensor for energy conversion device 66. The net torque output from energy conversion device 66 is transmitted to WHR torque model 204 to determine a net torque output from WHR system 12.

Pump torque module 202 includes a pressure summing module 250, a pump flow module 252, a pump efficiency module 254, a pump power module 256, and a pump torque module 258. Pressure summing module 250 subtracts the input from low-pressure sensor 74 from the input from high-pressure sensor 76 to obtain a pressure drop or differential pressure across expander 66. The pressure drop across expander 66 is transmitted to pump flow module 252 and to pump power module 256. Pump flow module 252 uses the pressure drop across expander 66 and the engine speed signal from engine speed sensor 110 to calculate a flow of working fluid through feed pump 54, which is then transmitted to pump power module 256. Pump efficiency module 254 also receives the engine speed signal from engine speed sensor 110 and uses the engine speed signal to calculate an efficiency of feed pump 54, which is transmitted to pump power module 256. Pump power module 256 uses the pressure drop across expander 66, the calculated pump flow from pump flow module 252, and the pump efficiency from pump efficiency module 254 to calculate a pump power, which is then transmitted to pump torque module 258. Pump torque module 258 uses the pump power calculated by pump power module 256 and the engine speed signal from engine speed sensor 110 to calculate a pump torque required to operate feed pump 54, thus forming a virtual torque sensor for feed pump 54.

In order to calculate pump efficiency, pump flow, pump power, and pump torque, a series of equations are used. Pump speed is derived from engine speed sensor 110, and in an exemplary embodiment, may be identical to the speed of engine 10. In an exemplary embodiment, Equation (3) may be used to calculate the efficiency, $P_{Eff}$, of feed pump 54.

Equation (4) may be used to calculate the pump flow in gallons per minute. Equation (5) may be used to calculate the pump power. Equation (6) may be used to calculate the pump torque.

$$P_{Eff} = 0.054 + \left\{ \frac{0.12}{570} * [PumpSpeed(\text{rpm}) - 1260] \right\} \quad \text{Equation (3)}$$

$$PumpFlow(\text{gpm}) = \\ \left\{ \frac{PumpSpeed(\text{rpm})}{2114} * 12.57 * \left[ 1 - \frac{0.153}{266} * (P_{High} - P_{Low}) \right] \right\} \quad \text{Equation (4)}$$

In Equation (2), $P_{High}$ is the signal from high-pressure sensor 76 and $P_{Low}$ is the signal from low-pressure signal 74, which are used to calculate a pressure rise or a pressure differential across expander 66 in PSI.

$$PumpPower(\text{kW}) = \\ PumpFlow(\text{gpm}) * 0.000063 * \left[ \frac{(P_{High} - P_{Low})}{P_{Eff}} \right] \quad \text{Equation (5)}$$

$$PumpTorque(\text{Nm}) = \frac{PumpPower(\text{kW})}{PumpSpeed(\text{rpm})} * 46326.77 \quad \text{Equation (6)}$$

WHR torque module 204 subtracts the pump torque from the net torque output from energy conversion device 66 to calculate a net WHR system 12 output torque, as shown in Equation (7), which is then provided either to another module 206 in control module 70 or as a net torque output 208 from control module 70 to another system on a vehicle in which engine 10 is located.

NetTorque (Nm)=TurnTorque (Nm)−PumpTorque (Nm)  Equation (7)

Figure 4:
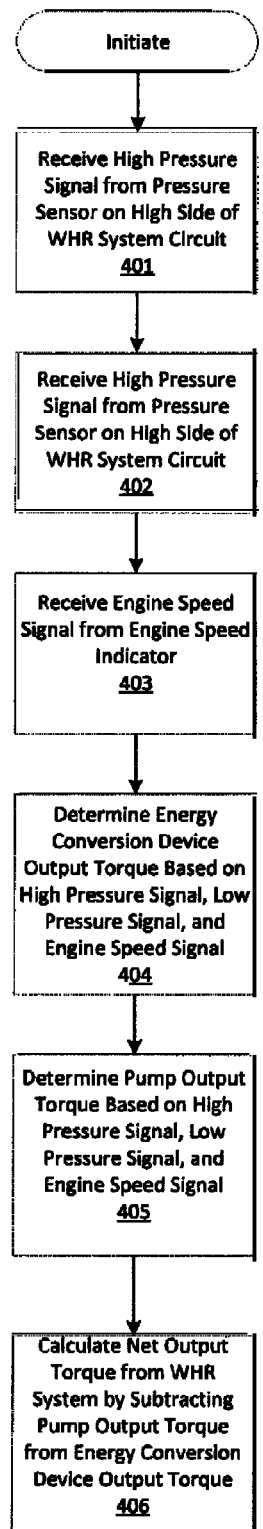
FIG. 4 is a flow diagram showing a computerized method of determining a net output torque from a waste heat recovery system of an internal combustion engine system, in accordance with example embodiments.

FIG. 4 is a flow diagram showing a computerized method of determining a net output torque from a waste heat recovery system of an internal combustion engine system, in accordance with example embodiments. The process 400 may be controlled by one or more engine controllers of the internal combustion engine and may be used by the one or more engine controllers to control various processes such as shifts of a transmission coupled to the internal combustion engine and/or to provide information such as fuel efficiency of the engine and control processes related to or using the information. At 401, a high pressure value from a first pressure corresponding to fluid pressure on a high pressure side of a fluid circuit of a waste heat recovery system of an internal combustion engine is received. The high pressure sensor may be positioned upstream of the energy conversion device so as to measure a high pressure of the liquid working fluid upstream of the energy conversion device. At 402, a low pressure value from a second pressure sensor corresponding to fluid pressure on a low pressure side of a fluid circuit of the waste heat recovery system is received. The low pressure sensor may be positioned downstream of the energy conversion device so as to measure a low pressure of the liquid working fluid downstream of the energy conversion device.

At 403, an engine speed value is received from an engine speed indicator, such as a tachometer. The engine speed value provides a speed of the internal combustion engine. At 404, an energy conversion device output torque of a pump component of the waste heat recovery system is determined based on the high pressure value, the low pressure value and the engine speed value, in accordance with example embodiments. At 405, a pump output torque of an energy conversion device of the waste heat recovery system is determined based on the high pressure value, the low pressure value and the engine speed value, in accordance with example embodiments. The net output torque from the waste heat recovery system is calculated at 406 based on a difference between the energy conversion device output torque and the pump output torque.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

Any sensor described herein may include a virtual sensor that looks up values from a non-transient memory value, receives it from a data link, from an electronic input, and/or from a hardware sensor directly measuring the value or something analogous to the value.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

In the claims, as well as in the specification above, all transitional phrases such as "comprising," "including," "having," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of determining a net output torque from a waste heat recovery system of an internal combustion engine, the method comprising:
receiving, via a fluid circuit, a high pressure value corresponding to fluid pressure on a high pressure side of the fluid circuit of a waste heat recovery system of an internal combustion engine, the high pressure value being from a first pressure sensor;
receiving, via the fluid circuit, a low pressure value corresponding to fluid pressure on a low pressure side of the fluid circuit of the waste heat recovery system, the low pressure value being from a second pressure sensor;
receiving an engine speed value, the engine speed value being from an engine speed indicator;
determining, by engine control circuitry, an energy conversion device output torque of an energy conversion device of the waste heat recovery system based on the high pressure value, the low pressure value, and the engine speed value;
determining, by the engine control circuitry, a pump output torque of a pump component of the waste heat recovery system based on the high pressure, the low pressure value, and the engine speed value;
calculating a net output torque from the waste heat recovery system based on a difference between the energy conversion device output torque and the pump output torque; and
based on the net output torque from the waste heat recovery system, controlling a shift point in a transmission driven by the internal combustion engine.

2. The method of claim 1, further comprising determining the energy conversion device output torque of an energy conversion device of the waste heat recovery system in response to a time derivative of the high pressure value, the low pressure value, or a combination thereof.

3. The method of claim 1, further comprising determining the energy conversion device output torque of an energy conversion device of the waste heat recovery system in response to a static torque of the energy conversion device under a steady state condition.

4. The method of claim 1, further comprising determining a pump power value and a pump speed value, and determining the pump output torque in response to the pump power value and the pump speed value.

5. The method of claim 1, further comprising determining a pump flow value and a pump efficiency value, and wherein the determining the pump power value further comprises determining the pump power value in response to the pump flow value and the pump efficiency value.

6. An internal combustion engine system, comprising: a waste heat recovery system comprising:
a condenser structured to operate on a working fluid;
a feed pump fluidly coupled to the condenser and positioned downstream of the condenser so as to receive at least a portion of the working fluid from the condenser;
a heat exchanger fluidly coupled to the feed pump downstream of the condenser so as to receive the at least a portion of the working fluid from the pump, the heat exchanger including a waste heat fluid circuit;
an energy conversion device fluidly coupled to the heat exchanger so as to receive the at least a portion of the working fluid from the heat exchanger, the energy conversion device fluidly coupled to the condenser;
a high pressure sensor positioned upstream of the energy conversion device and configured to determine a high pressure value of the working fluid upstream of the energy conversion device;
a low pressure sensor positioned downstream of the energy conversion device and configured to determine a low pressure value of the working fluid downstream of the energy conversion device;
an internal combustion engine fluidly coupled to the waste heat fluid circuit of the heat exchanger;
an engine speed sensor configured to determine an engine speed value of the internal combustion engine; and
a net torque calculator of an engine controller associated with the internal combustion engine configured to determine a net output torque from the waste heat recovery system based on a difference between an energy conversion device output torque and a pump output torque, the energy conversion device output torque and the pump output torque determined based on the high pressure value, the low pressure value, and the engine speed value.

7. The internal combustion engine system of claim 6, wherein the energy conversion device includes at least one of a turbine, a piston, a scroll, a screw, and an expander device configured to perform energy conversion as a result of a vapor of the working fluid expanding.

8. The internal combustion engine system of claim 6, wherein the heat exchanger further comprises an exhaust gas recirculation boiler upstream from the condenser.

9. The internal combustion engine system of claim 6, wherein the waste heat recovery system further comprises a pre-charge air cooler.

10. The internal combustion engine system of claim 6, wherein the waste heat recovery system further comprises a recuperator configured to transfer heat from a first portion of the working fluid flowing from the energy conversion device to the condenser to a second portion of the working fluid flowing from the feed pump to the heat exchanger.

11. The internal combustion engine system of claim 6, wherein the waste heat fluid circuit includes an exhaust gas recirculation fluid of the internal combustion engine.

12. The internal combustion engine system of claim 6, further comprising a sub-cooler coupled to the condenser.

13. The internal combustion engine system of claim 6, further comprising a receiver positioned upstream of the condenser and downstream of the energy conversion device.

14. The internal combustion engine system of claim 6, further comprising a fluid level sensor configured to determine a level value of the working fluid in the waste heat recovery system.

15. A waste heat recovery system net output torque control system comprising:
an energy conversion device output torque module configured to determine an energy conversion device output torque of an energy conversion device of a waste heat recovery system based on:
a determination, via a high-pressure sensor, of a high pressure value of a high pressure side of a fluid circuit of the waste heat recovery system;
a determination, via a low-pressure sensor, of a low pressure value of a low pressure side of the fluid circuit of the waste heat recovery system; and
a determination, via an engine speed indicator, of an engine speed value of an internal combustion engine in fluid communication with the waste heat recovery system;
a pump output torque module circuit configured to determine a pump output torque of a pump component of the waste heat recovery system based on the determination of the high pressure value, the low pressure value, and the engine speed value;
a net torque module configured to determine a net output torque from the waste heat recovery system based on a difference between the energy conversion device output torque and the pump output torque; and
a transmission shift module configured to control a shift point in a transmission driven by the internal combustion engine based on the net output torque being determined.

16. The waste heat recovery system net output torque control system of claim 15, wherein the energy conversion device output torque module is further configured to determine the energy conversion device output torque of the energy conversion device based on a static torque of the energy conversion device under a steady state condition.

17. The waste heat recovery system net output torque control system of claim 15, wherein the pump output torque module is further configured to determine a pump power value and a pump speed value, and to determine the pump output torque in response to the pump power value and the pump speed value.

18. The waste heat recovery system net output torque control system of claim 17, wherein the pump output torque module is further configured to determine a pump flow value and a pump efficiency value, and to determine the pump power value and the pump speed value in response to the pump flow value and the pump efficiency value.

* * * * *